(12) United States Patent  (10) Patent No.: US 9,329,812 B2
Oba  (45) Date of Patent: May 3, 2016

(54) SYSTEM, IMAGE PROCESSING APPARATUS, AND METHOD FOR CONTROLLING THE POWER SAVING STATE OF AN IMAGE OUTPUT APPARATUS

(71) Applicant: CANON KABUSHIKI KAISHA, Tokyo (JP)

(72) Inventor: Yoshitaka Oba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/680,899

(22) Filed: Apr. 7, 2015

(65) Prior Publication Data

US 2015/0293723 A1 Oct. 15, 2015

(30) Foreign Application Priority Data

Apr. 11, 2014 (JP) .................................. 2014-081642

(51) Int. Cl.
*G06F 3/12* (2006.01)
*H04N 1/00* (2006.01)

(52) U.S. Cl.
CPC ............ *G06F 3/1221* (2013.01); *G06F 3/1236* (2013.01); *G06F 3/1285* (2013.01); *H04N 1/00233* (2013.01); *H04N 1/00896* (2013.01)

(58) Field of Classification Search
None
See application file for complete search history.

(56) References Cited

U.S. PATENT DOCUMENTS

| 7,537,163 | B2* | 5/2009 | Kikuta | G03G 15/5004 235/462.01 |
| 8,185,767 | B2* | 5/2012 | Ballou | H04L 12/10 713/300 |
| 8,677,156 | B2* | 3/2014 | Wakamiya | G03G 15/5004 315/291 |
| 8,934,123 | B2* | 1/2015 | Kawasato | G06K 15/02 358/1.15 |
| 9,032,230 | B2* | 5/2015 | Kuroko | G06K 15/4055 713/300 |

FOREIGN PATENT DOCUMENTS

JP 2004-262065 A 9/2004

* cited by examiner

*Primary Examiner* — Paul F Payer
(74) *Attorney, Agent, or Firm* — Canon U.S.A., Inc. IP Division

(57) ABSTRACT

A system includes an image processing apparatus that generates a print image based on a print job received from an external apparatus and an image output apparatus that prints using the print image. The image processing apparatus includes a determination unit that determines whether the image processing apparatus can communicate with the external apparatus and a transmission unit that, if it is determined that the image processing apparatus cannot communicate with the external apparatus, transmits to the image output apparatus an instruction to cause the image output apparatus to transition to a power saving state. The image output apparatus includes a reception unit that receives the instruction and a control unit that, if the reception unit receives the instruction, causes the image output apparatus to transition to the power saving state.

19 Claims, 10 Drawing Sheets

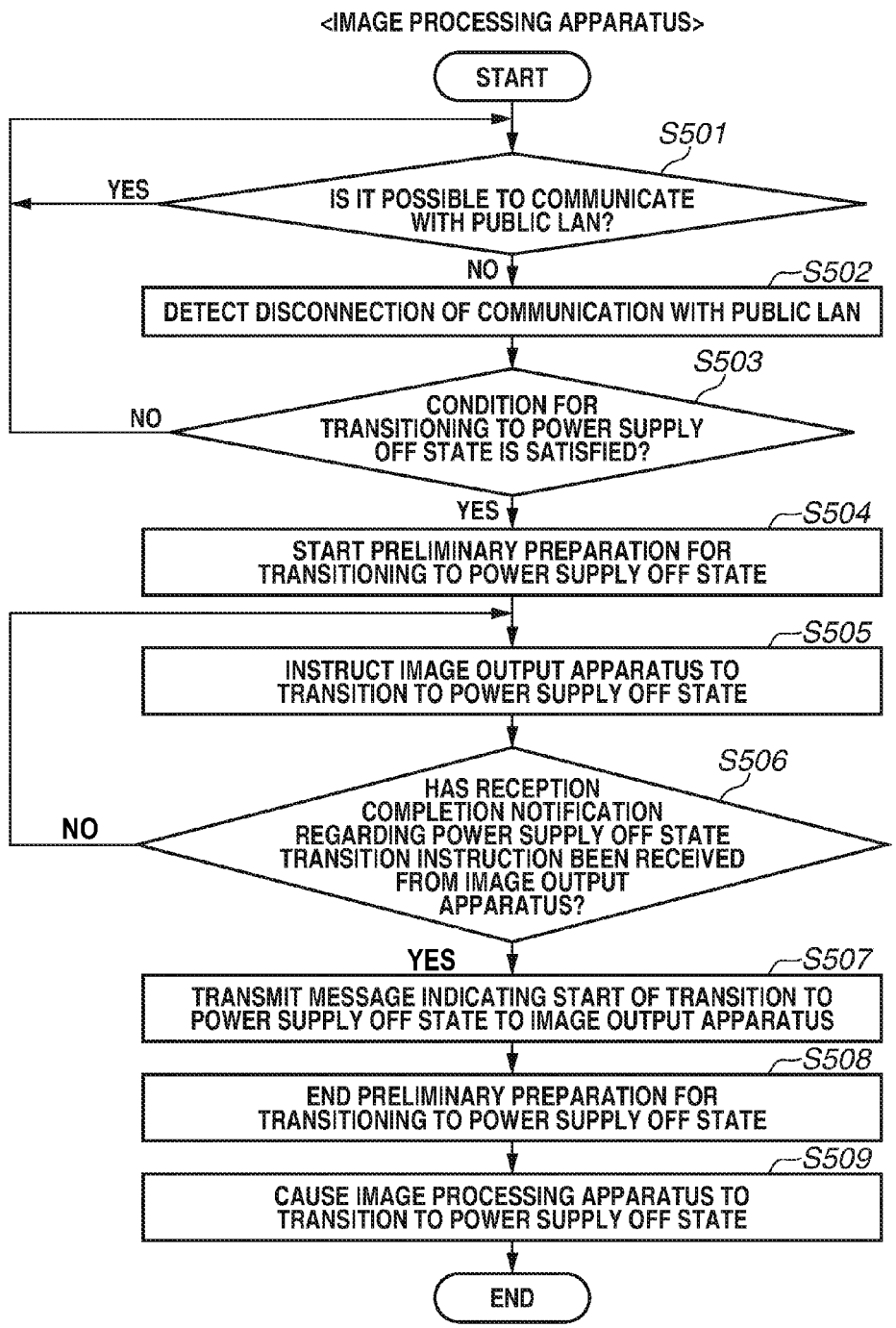

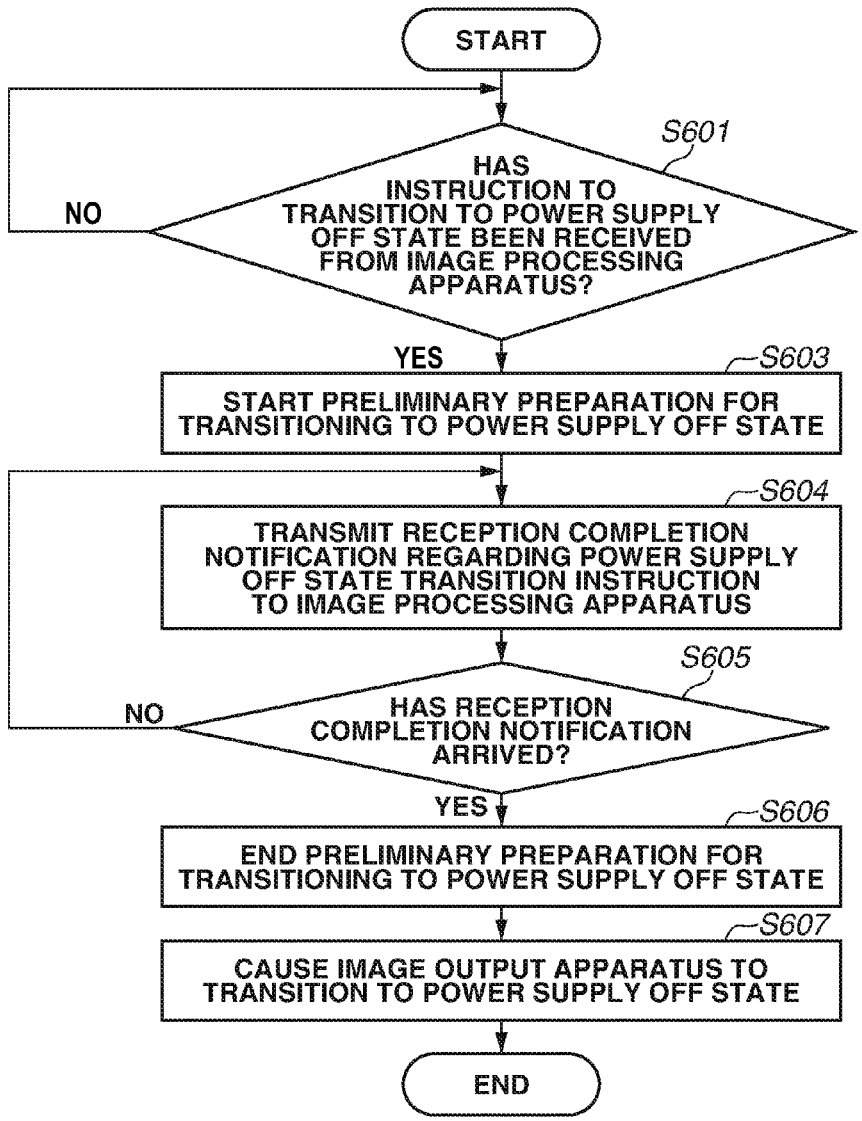

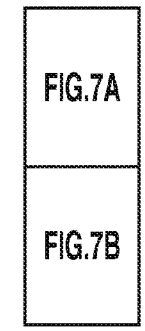
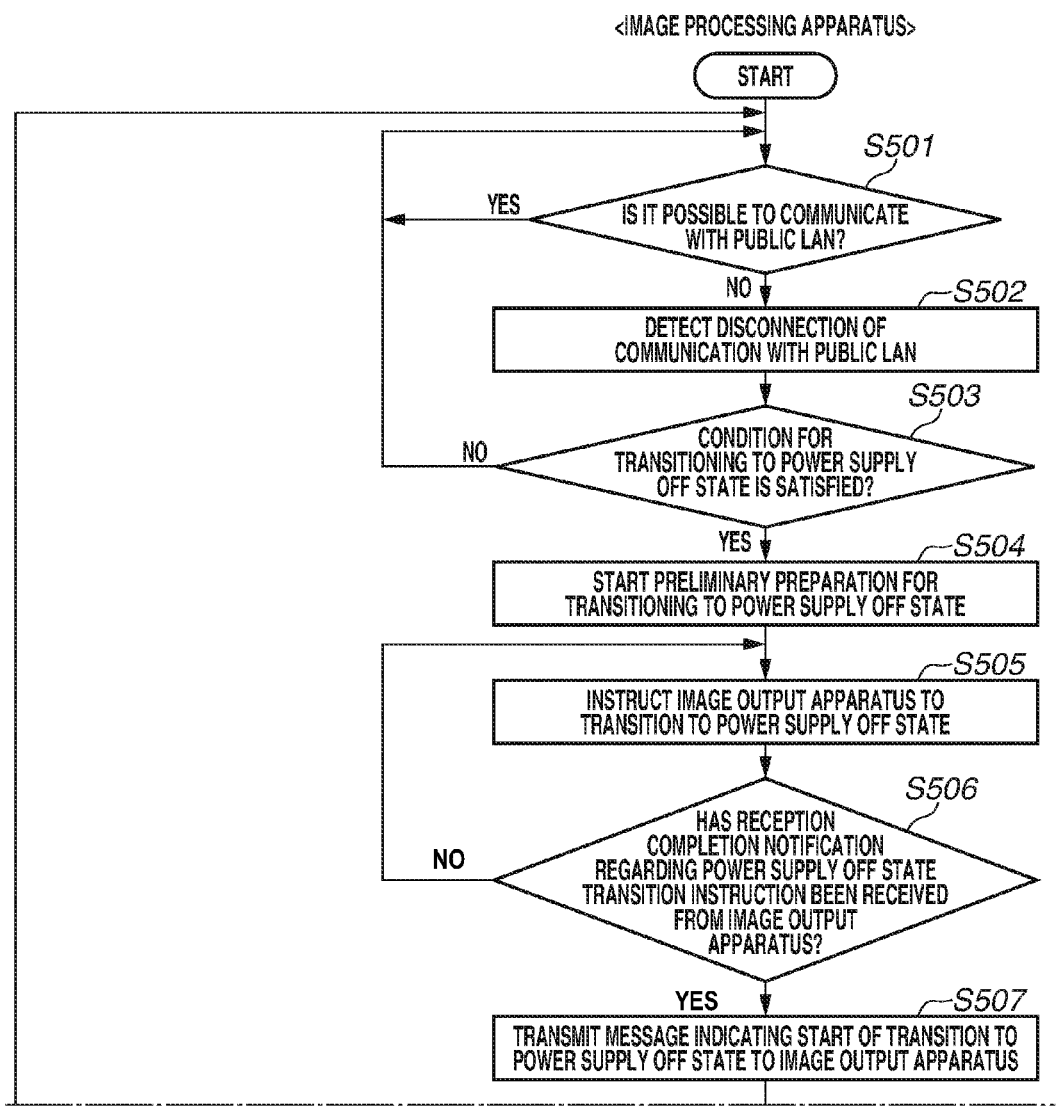

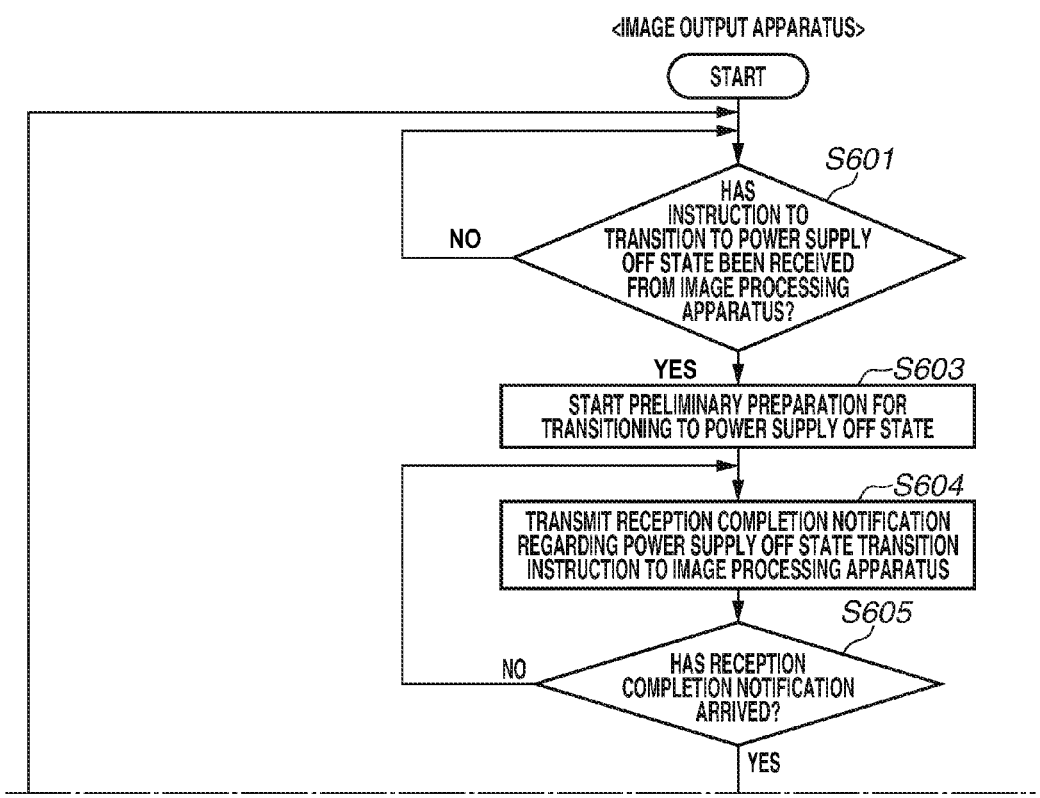

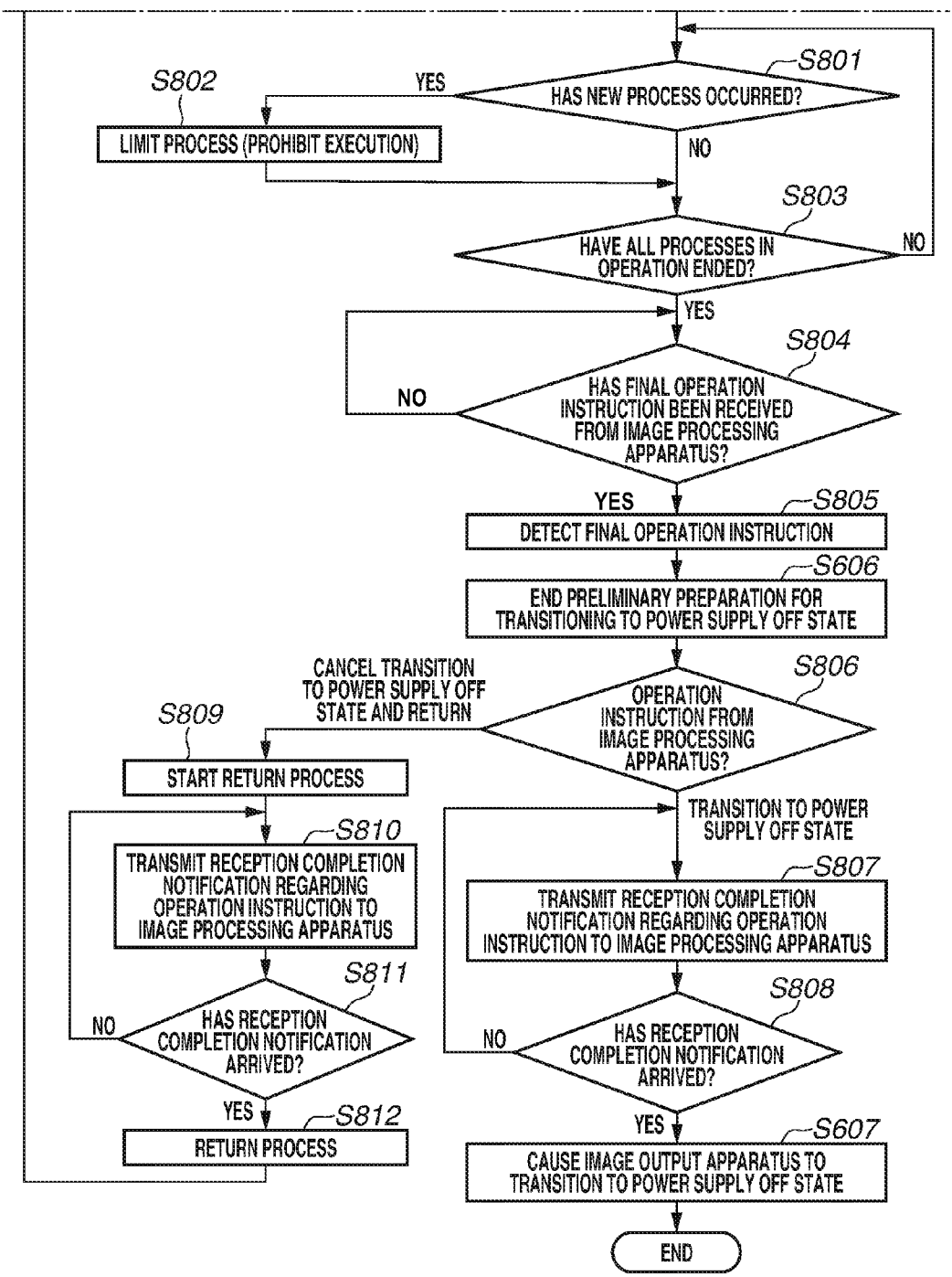

SYSTEM, IMAGE PROCESSING APPARATUS, AND METHOD FOR CONTROLLING THE POWER SAVING STATE OF AN IMAGE OUTPUT APPARATUS

BACKGROUND

1. Field

Aspects of the present invention generally relate to a system where an image processing apparatus and an image output apparatus cooperate to perform image processing.

2. Description of the Related Art

In recent years, the protection of the natural environment has been increasingly attracting attention. Accordingly, electrical appliances need to be equipped with technology related to energy saving (power saving) in terms of protecting the natural environment. In a known power saving technique in an image processing system where an image processing apparatus and an image output apparatus cooperate to perform image processing, if the power switch of the image output apparatus is turned off, the image output apparatus and the image processing apparatus are both shut down (the publication of Japanese Patent Application Laid-Open No. 2004-262065).

Meanwhile, there is the Eco-Design Directive for Energy-related Products (hereinafter referred to as the "ErP Directive") as a regulation for making environmentally conscious designs obligatory in energy-related products in European Union (EU) countries. This directive demands a reduction in the environmental load of an energy-using product in its entire life cycle. The ErP Directive includes Lot 26, which prescribes a standby state of a device having a network communication function. In terms of the environmental consciousness of energy, Lot 26 prescribes that the power supply of a device to be turned off when the device is not connected to a network.

In an image processing system as described above, print data created by a client computer provided on a public network is received by an image processing apparatus to which the print data is to be input. Then, the image processing apparatus performs raster image processing (RIP) on the print data, thereby generating image data. Then, the generated image data is transmitted to an image output apparatus, and the image output apparatus outputs the image data.

If, however, a communication abnormality occurs in the public network due to, for example, stoppage of a communication device, restart of a communication device, the disconnection of wiring, etc., the connection between the public network and the image processing apparatus is lost. Thus, to reduce the power consumption of the image processing apparatus when not connected to the network according to the regulation of the ErP Directive, the power supply of the image processing apparatus needs to be turned off. However, even if the power supply of the image processing apparatus has been turned off, an apparatus that cooperates with the image processing apparatus keeps operating with no purpose. This unnecessarily consumes power. This is not limited to an image processing system as described above, but is common to systems where a plurality of apparatuses cooperate to process a job received from a network.

SUMMARY

Aspects of the present invention are generally directed to providing a mechanism capable of, if the communication between a network and a system has been disconnected, reducing unnecessary power consumption in the system.

According to an aspect of the present invention, a system includes an image processing apparatus configured to generate a print image based on a print job received from an external apparatus and an image output apparatus configured to print using the print image transmitted from the image processing apparatus. The image processing apparatus includes a determination unit configured to determine whether the image processing apparatus can communicate with the external apparatus, and a first transmission unit configured to, if the determination unit determines that the image processing apparatus cannot communicate with the external apparatus, transmit to the image output apparatus an instruction to cause the image output apparatus to transition to a power saving state. The image output apparatus includes a first reception unit configured to receive the instruction transmitted from the first transmission unit, and a first control unit configured to, if the first reception unit has received the instruction, cause the image output apparatus to transition to the power saving state.

Further features of the present disclosure will become apparent from the following description of exemplary embodiments with reference to the attached drawings.

BRIEF DESCRIPTION OF THE DRAWINGS

FIG. 5 is a flow chart illustrating the processing performed by the image processing apparatus according to a first exemplary embodiment.

FIG. 6 is a flow chart illustrating the processing performed by the image output apparatus according to the first exemplary embodiment.

FIG. 8 (including FIGS. 8A and 8B) is a flow chart illustrating the processing performed by an image output apparatus according to the second exemplary embodiment.

DESCRIPTION OF THE EMBODIMENTS

Figure 1:
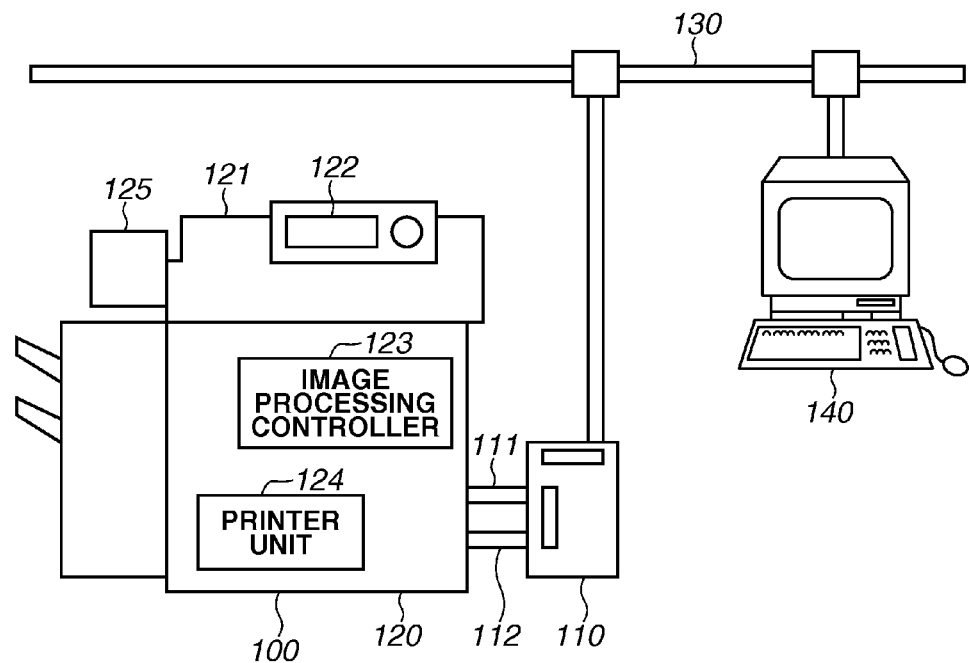
FIG. 1 is a diagram illustrating the overall configuration of an image processing system according to an exemplary embodiment.

FIG. 1 is a diagram illustrating the overall configuration of an image processing system 100 according to a first exemplary embodiment. As illustrated in FIG. 1, the image processing system 100 includes an image processing apparatus 110 and an image output apparatus (image forming apparatus) 120. In the image processing system 100, a client computer 140 and the image processing apparatus 110 are connected together via a network 130 such as an Ethernet® cable such that the client computer 140 and the image processing apparatus 110 can communicate with each other. Further, the image processing apparatus 110 and the image output apparatus 120 are connected together via a control cable 111 and an image video cable 112. The network 130 is not limited to Ethernet®, and includes any network, whether wired or wireless.

In the present exemplary embodiment, the image output apparatus 120 is not directly connected to the network 130. That is, the image output apparatus 120 and the client computer 140 communicate with each other via the image processing apparatus 110. Alternatively, the configuration may be such that the image output apparatus 120 is directly connected to the network 130. That is, the image output apparatus 120 may communicate with each other in a manner other than via the image processing apparatus 110.

The client computer 140 starts an application and gives a print instruction to the image processing system 100. The image processing apparatus 110 and the image output apparatus 120 cooperate to perform image processing. The image output apparatus 120 is a multifunction peripheral (MFP).

As illustrated in FIG. 1, the image output apparatus 120 includes a scanner unit 121, an operation unit 122, an image processing controller 123, a printer unit 124, and a fax unit 125. The scanner unit 121 reads a document and inputs image data. The operation unit 122 includes various keys and a panel. Further, the operation unit 122 receives various instructions from a user via the various keys. Further, the operation unit 122 displays various pieces of information on the panel. The image processing controller 123 controls the scanner unit 121 and the printer unit 124. The details of the image processing controller 123 will be described later. The printer unit 124 performs printing on a sheet based on image data. The fax unit 125 is connected to a telephone circuit (not illustrated) and performs the process of inputting and outputting a facsimile via the telephone circuit.

The image output apparatus 120 having the above configuration can perform the following functions.

Copy Function

The image output apparatus 120 records image data of a document read by the scanner unit 121 in a hard disk drive (HDD) 216 (FIG. 2), and the printer unit 124 performs printing on a sheet, which is a recording medium, based on the image data.

SEND Function

The image output apparatus 120 transmits image data of a document read by the scanner unit 121 to the client computer 140 via the network 130.

BOX Function

The image output apparatus 120 records image data of a document read by the scanner unit 121 in the HDD 216. Further, the image output apparatus 120 stores image data transmitted from the client computer 140 in the HDD 216.

Print Function

The printer unit 124 interprets and prints page description language (PDL) data transmitted from the client computer 140.

<Configurations of Image Processing Apparatus and Image Output Apparatus>

Figure 2:
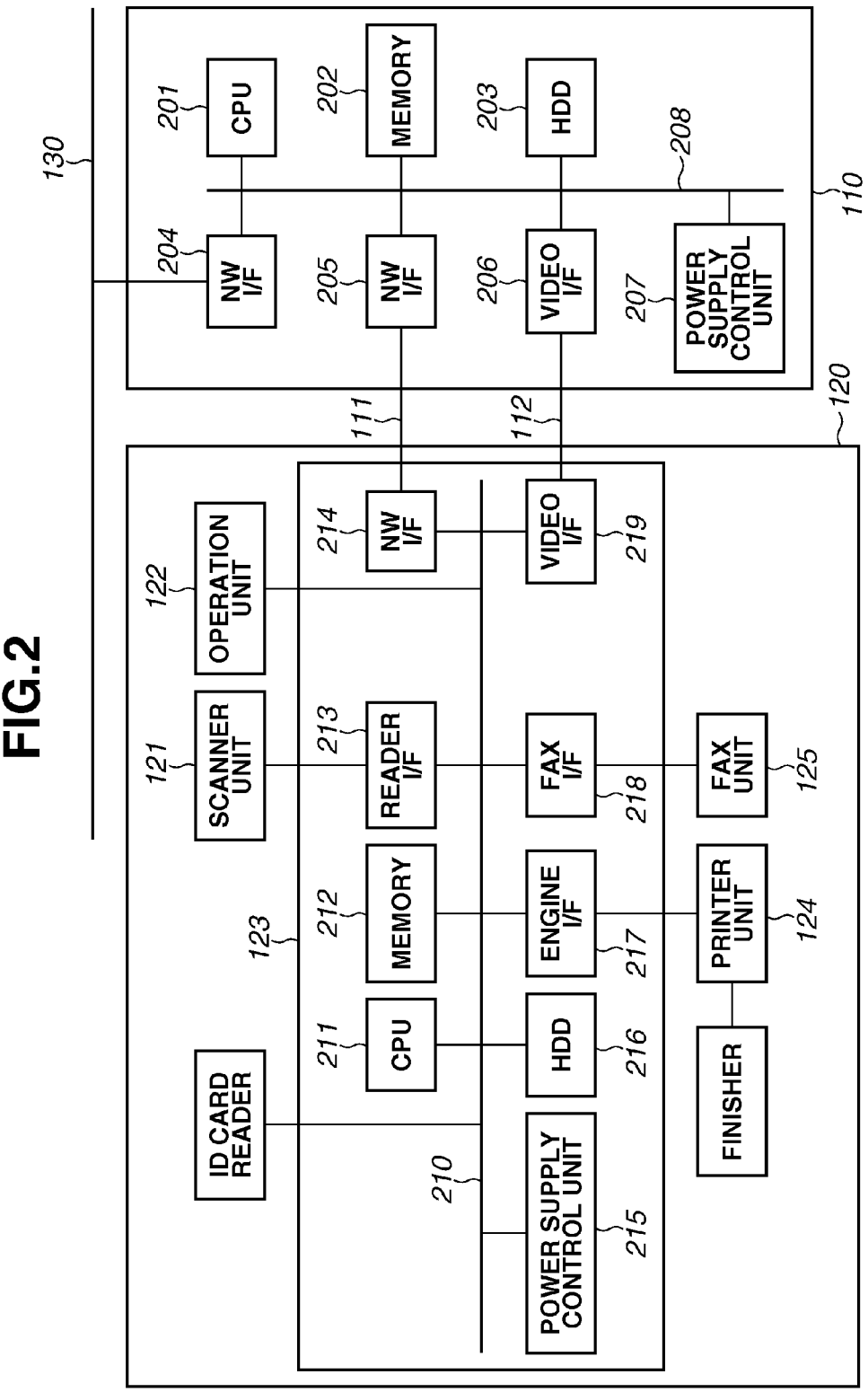
FIG. 2 is a hardware block diagram illustrating an image processing apparatus and an image output apparatus.

FIG. 2 is a hardware block diagram illustrating the image processing apparatus 110 and the image output apparatus 120.

First, the configuration of the image processing apparatus 110 is described.

The image processing apparatus 110 includes a central processing unit (CPU) 201, a memory 202, an HDD 203, a network interface (I/F) (NW I/F) 204, a network I/F (NW I/F) 205, a video I/F 206, and a power supply control unit 207.

The CPU 201 controls all the components of the image processing apparatus 110, performs calculations, and executes a program stored in a storage device (the memory 202 or the HDD 203), via a system bus 208. The memory 202 is used as a work memory of the CPU 201. The HDD 203 is a large-capacity storage device and stores various control programs to be executed by the CPU 201 and image data. The image processing apparatus 110 may include a different storage device such as a solid-state drive (SSD), instead of the HDD 203.

The network I/F 204 is a network interface for connecting to and communicating with another apparatus such as the client computer 140 via the network 130. The network I/F 205 is a network interface for transmitting and receiving a control command to and from the image output apparatus 120 via the control cable 111. The video I/F 206 transmits and receives image data to and from the image output apparatus 120 via the image video cable 112. The power supply control unit 207 controls the supply of power to all the components of the image processing apparatus 110.

Next, the details of the image processing controller 123 of the image output apparatus 120 are described.

The image processing controller 123 of the image output apparatus 120 includes a CPU 211, a memory 212, a reader I/F 213, a network I/F (NW I/F) 214, a power supply control unit 215, an HDD 216, an engine I/F 217, a fax I/F 218, and a video I/F 219.

The CPU 211 controls all the components of the image output apparatus 120, performs calculations, and executes a program stored in a storage device (the memory 212 or the HDD 216), via a system bus 210. The memory 212 is used as a work memory of the CPU 211. The reader I/F 213 transmits and receives a control command to and from the scanner unit 121 and the operation unit 122.

The network I/F 214 is a network interface for transmitting and receiving a control command to and from the image processing apparatus 110 via the control cable 111. The HDD 216 is a large-capacity storage device and stores various control programs to be executed by the CPU 211 and image data. The image processing controller 123 may include a different storage device such as an SSD, instead of the HDD 216.

The engine I/F 217 transmits and receives a control command to and from the printer unit 124. The fax I/F 218 is connected to the fax unit 125. The video I/F 219 transmits and receives image data to and from the image processing apparatus 110 via the image video cable 112. The power supply control unit 215 controls the supply of power to all the components of the image output apparatus 120.

The power supply of the image processing apparatus 110 is managed by the power supply control unit 207. When the image processing apparatus 110 is in a standby state, the power supply control unit 207 controls the power supply so that power is supplied to all the components, namely the CPU 201, the memory 202, the HDD 203, the network I/F 204, the network I/F 205, and the video I/F 206.

Further, when the image processing apparatus 110 is in a power saving state, the power supply control unit 207 controls the power supply so that the supply of power to the CPU 201, the HDD 203, and the video I/F 206 is stopped, and power is supplied to only limited components such as the memory 202, the network I/F 204, and the network I/F 205.

Further, when the image processing apparatus 110 is in a power supply off state, the power supply control unit 207 controls the power supply such that the supply of power to the CPU 201, the memory 202, the HDD 203, the network I/F 204, the network I/F 205, and the video I/F 206 is stopped.

On the other hand, the power supply of the image output apparatus 120 is managed by the power supply control unit 215. When the image output apparatus 120 is in a standby state, the power supply control unit 215 controls the power supply so that power is supplied to all the components, namely the scanner unit 121, the operation unit 122, the image processing controller 123, the printer unit 124, and the fax unit 125.

Further, when the image output apparatus 120 is in a power saving state, the power supply control unit 215 stops the supply of power to the scanner unit 121, the operation unit 122, and the printer unit 124. Further, in the power saving state, the power supply control unit 215 also stops the supply of power to the CPU 211, the HDD 216, the engine I/F 217, the video I/F 219, the reader I/F 213, and the fax I/F 218 of the image processing controller 123. In the power saving state, power is supplied to limited components such as the power supply control unit 215, the memory 212, and the network I/F 214, and the supply of power to the other components is stopped.

Further, when the image output apparatus 120 is in a power supply off state, the power supply control unit 215 stops the supply of power to the scanner unit 121, the operation unit 122, the printer unit 124, and the CPU 211, the memory 212, the reader I/F 213, the network I/F 214, the HDD 216, the engine I/F 217, the fax I/F 218, and the video I/F 219 of the image processing controller 123.

<Software Configuration of Image Processing Apparatus>

Figure 3:
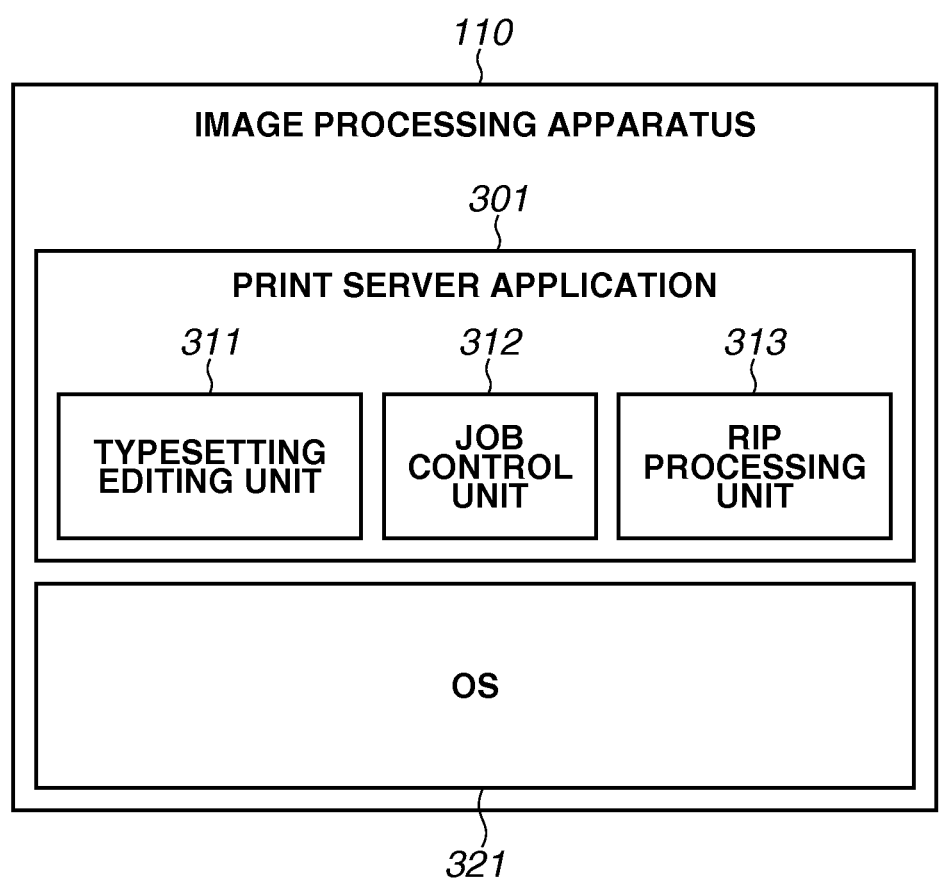
FIG. 3 is a software block diagram illustrating the image processing system.

With reference to FIG. 3, the software configuration of the image processing apparatus 110 is described below.

FIG. 3 is a diagram illustrating the software configuration of the image processing apparatus 110. Each piece of software illustrated in FIG. 3 is achieved by the CPU 201 reading and executing a program stored in the memory 202 or the HDD 203 of the image processing apparatus 110.

An operating system (OS) 321 indicates an OS that is the basic software of the image processing apparatus 110. A print server application 301 is application software that operates on the OS 321 executed by the CPU 201. The print server application 301 includes a typesetting editing unit 311, a job control unit (JOB control unit) 312, and an RIP processing unit 313 and performs various types of predetermined processing including image processing.

The typesetting editing unit 311 is an editing unit for, based on an instruction from the client computer 140, performing a typesetting editing process for editing image data on each page to change into a bookbinding typesetting format. The job control unit 312 is a control unit for controlling a print job based on an instruction from the client computer 140. Specifically, the job control unit 312 receives a print job from the client computer 140, gives an instruction to execute the print job, and controls the print order of the print job. The RIP processing unit 313 is a unit for converting a PDL into a raster image that can be printed when the typesetting editing unit 311 performs typesetting or when the job control unit 312 performs an actual image forming process.

For example, the image processing apparatus 110 performs image processing on a print job received from the network 130 and submits the resulting print job to the image output apparatus 120. Then, the image output apparatus 120 outputs an image based on the job submitted from the image processing apparatus 110.

<Transition of Power State of Image Processing Apparatus>

Figure 4:
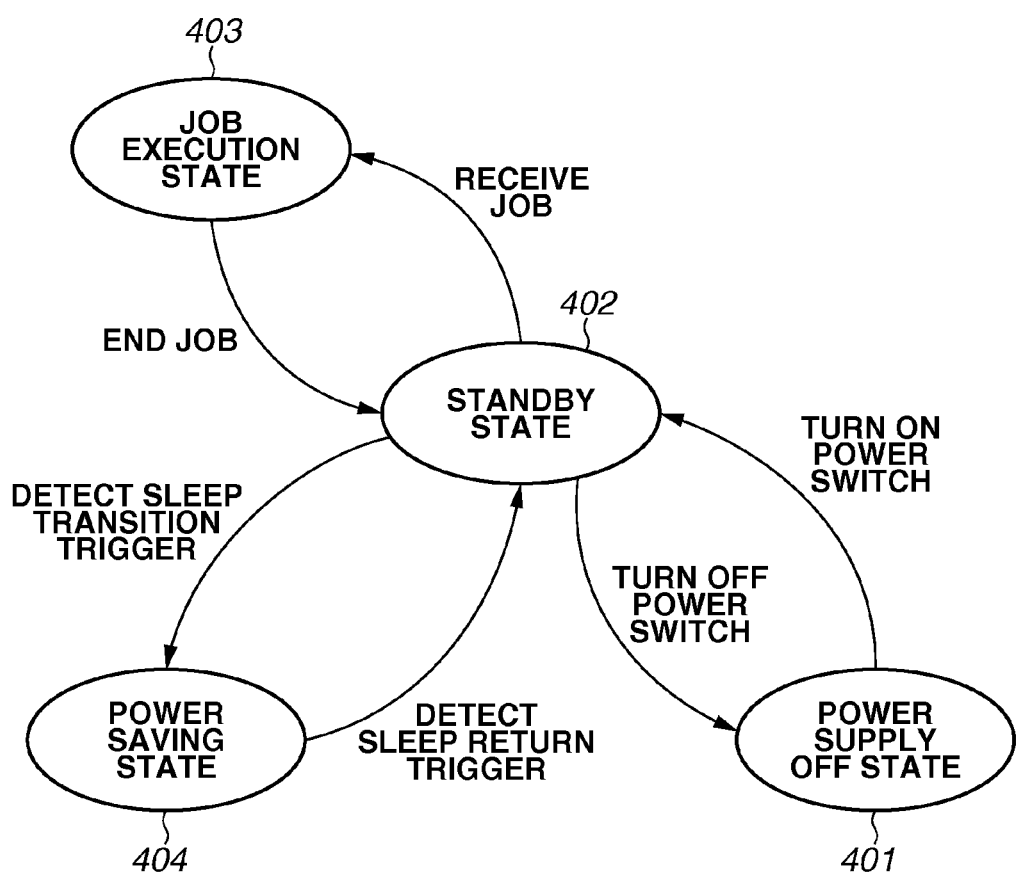
FIG. 4 is a state transition diagram illustrating the transition of the power state of the image processing system.

FIG. 4 is a state transition diagram illustrating the transition of the power state of the image processing apparatus 110 and the image output apparatus 120.

The image processing apparatus 110 and the image output apparatus 120 according to the present exemplary embodiment enter any types of power states including a power supply off state 401, a standby state (first power state) 402, a job execution state 403, and a power saving state (second power state) 404. The above four states are only examples and are not seen to be limiting. Alternatively, the image processing apparatus 110 and the image output apparatus 120 may be in another power state. For example, the image processing apparatus 110 and the image output apparatus 120 may be in a suspend state or a hibernation state.

First, the power state of the image processing apparatus 110 is described.

If the types of power states of the image processing apparatus 110 are arranged in descending order of power consumption, the job execution state 403>the standby state 402>the power saving state 404>the power supply off state 401.

The power supply off state 401 is a state where the supply of power is stopped to all the components of the image processing apparatus 110. If the user supplies power to the image processing apparatus 110 in the power supply off state 401, the power supply state of the image processing apparatus 110 transitions to the standby state 402.

The standby state 402 is a state where the image processing apparatus 110 is waiting for access from the client computer 140, and power is supplied to all the components of the image processing apparatus 110. In the standby state 402, power does not necessarily need to be supplied to all the components of the image processing apparatus 110. Power may be supplied to essential components and may not be supplied to the other components (e.g., the video I/F 206). If the image processing apparatus 110 has received network access from the client computer 140 in the standby state 402, the image processing apparatus 110 transitions to the job execution state 403. Further, if a sleep transition trigger has occurred in the standby state 402, the image processing apparatus 110 transitions to the power saving state 404.

The sleep transition trigger includes:

the fact that the user has pressed a sleep transition button (not illustrated)

the fact that a predetermined time has elapsed while a print job or the like is not executed in the standby state 402 the fact that a predetermined time has elapsed in the state where the client computer 140 does not get network access to the image processing apparatus 110.

Further, if the user has stopped the supply of power to the image processing apparatus 110 in the standby state 402, a shut down process is performed, and the image processing apparatus 110 transitions to the power supply off state 401. The shut down process is the process of terminating the OS and the application for the purpose of terminating the image processing apparatus 110.

The job execution state 403 is a state where the image processing apparatus 110 is executing a job, and power is supplied to all the components of the image processing apparatus 110. It should be noted that in the job execution state 403, power does not necessarily need to be supplied to all the components of the image processing apparatus 110. Alternatively, power may be supplied to essential components and may not be supplied to the other components (e.g., the video I/F 206). Further, power may not be supplied to a unit that is not used to execute the job. Specifically, if a print job is only being edited without performing printing, the supply of power to the video I/F 206, which is not used to edit the print job, may be stopped. If the job has ended in the job execution state 403, the image processing apparatus 110 transitions to the standby state 402.

The power saving state 404 is a state where the image processing apparatus 110 is waiting while saving power, and power is supplied to some of the components of the image processing apparatus 110, including the network I/F 204. In the power saving state 404, the supply of power to the video I/F 206 is stopped. If a sleep return trigger is received in the power saving state 404, the image processing apparatus 110 transitions to the standby state 402. In addition, while remaining in the power saving state 404, the network I/F 204 and the network I/F 205 can respond to a simple packet transmitted via the network 130. This function is termed a substitute response. Examples of the simple packet include an Address Resolution Protocol (ARP) request packet, a Simple Network Management Protocol (SNMP) state acquisition packet, and an Internet Control Message Protocol (ICMP) neighbor search packet.

The sleep return trigger includes:

the fact that the user has pressed a sleep return button the fact that network access has been received from the client computer 140 the fact that network access has been received from the image output apparatus 120.

The suspend state is a state where the image processing apparatus 110 can quickly return to the standby state 402. In the suspend state, the supply of current to the memory 202 of the image processing apparatus 110 is maintained, and the image processing apparatus 110 starts in the standby state 402 using the state of the image processing apparatus 110 stored in the memory 202. The hibernation state is also a state where the image processing apparatus 110 can quickly return to the standby state 402. The hibernation state is similar in power state to the power supply off state 401, and the supply of power to all the components of the image processing apparatus 110 is stopped. The hibernation state, however, is different from the power supply off state 401 in that the state of the image processing apparatus 110 is stored in the HDD 203 of the image processing apparatus 110 before the image processing apparatus 110 transitions to the hibernation state. If the image processing apparatus 110 returns from the hibernation state to the standby state 402, the image processing apparatus 110 quickly returns based on the information stored in the HDD 203.

Next, the power state of the image output apparatus 120 is described.

If the types of power states of the image output apparatus 120 are arranged in descending order of power consumption, the job execution state 403>the standby state 402>the power saving state 404>the power supply off state 401.

The power supply off state 401 is a state where the supply of power to all the components of the image output apparatus 120 is stopped. If the user has supplied power to the image output apparatus 120 in the power supply off state 401, the power supply state of the image output apparatus 120 transitions to the standby state 402.

The standby state 402 is a state where the image output apparatus 120 is waiting for access from the image processing apparatus 110, and power is supplied to all the components of the image output apparatus 120. In the standby state 402, power does not necessarily need to be supplied to all the components of the image output apparatus 120. Power may be supplied to essential components and may not be supplied to the other components (e.g., the video I/F 219). If the image output apparatus 120 has received network access from the image processing apparatus 110 in the standby state 402, the image output apparatus 120 transitions to the job execution state 403. Further, if a sleep transition trigger is received in the standby state 402, the image output apparatus 120 transitions to the power saving state 404.

The sleep transition trigger includes:

the fact that the user has pressed the sleep transition button (not illustrated)

the fact that a predetermined time has elapsed while a print job or the like is not executed in the standby state 402 the fact that a predetermined time has elapsed in the state where the image processing apparatus 110 does not get network access to the image output apparatus 120.

Further, if the user has stopped the supply of power to the image output apparatus 120 in the standby state 402, a shut down process is performed, and the image output apparatus 120 transitions to the power supply off state 401. The shut down process is the process of terminating the OS and the application for the purpose of terminating the image output apparatus 120.

The job execution state 403 is a state where the image output apparatus 120 is executing a job, and power is supplied to all the components of the image output apparatus 120. Also in the job execution state 403, power does not necessarily need to be supplied to all the components of the image output apparatus 120. Power may be supplied to essential components and may not be supplied to the other components (e.g., the video I/F 219). Further, power may not be supplied to a unit that is not used to execute the job. Specifically, if a print job is only being edited without performing printing, the supply of power to the video I/F 219, which is not used to edit the print job, may be stopped. If the job has ended in the job execution state 403, the image output apparatus 120 transitions to the standby state 402.

The power saving state 404 is a state where the image output apparatus 120 is waiting while saving power, and power is supplied to some of the components of the image output apparatus 120, including the network I/F 214. In the power saving state 404, the supply of power to the video I/F 219 is stopped. If a sleep return trigger is received in the power saving state 404, the image output apparatus 120 transitions to the standby state 402. While remaining in the power saving state 404, the network I/F 214 can respond to a simple packet transmitted via the network 130. This function is termed a substitute response. The simple packets include an ARP request packet, an SNMP state acquisition packet, and an ICMP neighbor search packet.

The sleep return trigger includes:

the fact that the user has pressed the sleep return button the fact that network access has been received from the image processing apparatus 110.

The suspend state is a state where the image output apparatus 120 can quickly return to the standby state 402. In the suspend state, the supply of current to the memory 212 of the image output apparatus 120 is maintained, and the image output apparatus 120 is started in the standby state 402 using the state of the image output apparatus 120 stored in the memory 212. The hibernation state is also a state where the image output apparatus 120 can quickly return to the standby state 402. The hibernation state is similar in power state to the power supply off state 401, and the supply of power to all the components of the image output apparatus 120 is stopped. The hibernation state, however, is different from the power supply off state 401 in that the state of the image output apparatus 120 is stored in the HDD 216 of the image output apparatus 120 before the image output apparatus 120 transitions to the hibernation state. If the image output apparatus 120 returns from the hibernation state to the standby state 402, the image output apparatus 120 quickly returns based on the information stored in the HDD 216.

<Description of Operation of Image Processing Apparatus When Image Processing Apparatus and Image Output Apparatus Transition to Power Supply Off States>

With reference to FIG. 5, a description is given of the operation of the image processing apparatus 110 when the image processing apparatus 110 transitions to the power supply off state 401.

FIG. 5 is a flow chart illustrating the processing performed by the image processing apparatus 110 according to the first exemplary embodiment. The processing of the flow chart illustrated in FIG. 5 is achieved by the CPU 201 executing a program loaded into the memory 202.

In step S501, the CPU 201 periodically monitors the operating condition of the network I/F 204 and determines the state of communication between the image processing apparatus 110 and the public network 130. Then, if the CPU 201 determines that the image processing apparatus 110 and the public network 130 can communicate with each other (Yes in step S501), the CPU 201 repeats the state determination process in step S501. If, on the other hand, it is determined that the communication port of the network I/F 204 of the image processing apparatus 110 is in a link-down state where the communication port cannot communicate, the CPU 201 determines that the image processing apparatus 110 and the public network 130 cannot communicate with each other (No in step S501), and the processing proceeds to step S502. In step S502, the CPU 201 determines that the disconnection of the communication between the image processing apparatus 110 and the public network 130 has been detected, and the processing proceeds to step S503.

In step S503, the CPU 201 determines whether the detected disconnection of the communication between the image processing apparatus 110 and the public network 130 satisfies a condition for causing the power supply state of each of the image processing apparatus 110 and the image output apparatus 120 to transition to the power supply off state 401.

For example, if the image processing apparatus 110 side has disconnected the communication because the disconnection of the communication of the network I/F 204 has been erroneously detected, or in order that the network settings of the image processing apparatus 110 are changed, it is not necessary to transition to the power supply off state 401. Thus, it is determined that the detected state does not satisfy a condition for causing the power supply state to transition to the power supply off state 401. On the other hand, when the image processing apparatus 110 is connected to the public network 130, if the image processing apparatus 110 cannot be connected due to an abnormality or the restart of a network device of the public network 130, it is determined that the detected state satisfies a condition for causing the power supply state to transition to the power supply off state 401.

Then, if it is determined that the detected state does not satisfy a condition for causing the power supply state to transition to the power supply off state 401 (No in step S503), the processing returns to step S501.

If, on the other hand, it is determined that the detected state satisfies a condition for causing the power supply state to transition to the power supply off state 401 (Yes in step S503), the processing proceeds to step S504. The image processing apparatus 110 needs to perform predetermined processing (preliminary preparation) before causing the image processing apparatus 110 itself to transition to the power supply off state 401. The predetermined processing (preliminary preparation) is described in detail below.

In step S504, to transmit a message indicating an instruction to change the power supply state of the image output apparatus 120, the CPU 201 starts the preliminary preparation for causing the image processing apparatus 110 to transition to the power supply off state 401.

First, in step S505, the CPU 201 instructs the image output apparatus 120 connected to the image processing apparatus 110 to transition to the power supply off state 401. According to this instruction (the instruction to transition to the power supply off state 401), the image output apparatus 120 performs the processes of steps S601 to S604. In step S604, the image output apparatus 120 notifies the CPU 201 of the image processing apparatus 110 that the image output apparatus 120 has received the transition instruction (a reception completion notification).

In step S506, the CPU 201 of the image processing apparatus 110 determines whether the image processing apparatus 110 has received the notification that the image output apparatus 120 has received the instruction to transition to the power supply off state 401 (the reception completion notification). Then, if it is determined that the image processing apparatus 110 has not yet received the reception completion notification from the image output apparatus 120 ("NO" in step S506), the processing returns to step S505. In step S505, the CPU 201 sends the instruction to transition to the power supply off state 401 again.

If, on the other hand, it is determined in step S506 that the image processing apparatus 110 has received the reception completion notification from the image output apparatus 120 ("YES" in step S506), the processing proceeds to step S507. In step S507, in response to the arrival of the reception completion notification, the CPU 201 transmits to the image output apparatus 120 a message indicating that the image processing apparatus 110 will start the transition to the power supply off state 401 (a message indicating the start of the transition). According to this message, the image output apparatus 120 performs the processes of step S605 and transitions to the power supply off state 401.

Next, in step S508, the CPU 201 of the image processing apparatus 110 ends the preliminary preparation for causing the image processing apparatus 110 to transition to the power supply off state 401. Then, in step S509, the CPU 201 causes the image processing apparatus 110 to transition to the power supply off state 401, and the processing ends. In step S509, the CPU 201 instructs the power supply control unit 207 to turn off the power supply, and the power supply control unit 207 stops the supply of power to all the components of the image processing apparatus 110.

<Description of Operation of Image Output Apparatus When Image Processing Apparatus and Image Output Apparatus Transition to Power Supply Off States>

With reference to FIG. 6, a description is given below of the operation of the image output apparatus 120 when the image output apparatus 120 transitions to the power supply off state 401.

FIG. 6 is a flow chart illustrating the processing performed by the image output apparatus 120 according to the first exemplary embodiment. The processing of the flow chart illustrated in FIG. 6 is achieved by the CPU 211 executing a program loaded into the memory 212.

In step S601, the CPU 211 of the image output apparatus 120 periodically monitors the arrival of an instruction to transition to the power supply off state 401, which is transmitted from the image processing apparatus 110 in step S505 in FIG. 5. Then, if it is determined that the transition instruction has not arrived ("NO" in step S601), the CPU 211 repeats the determination process in step S601. If, on the other hand, it is determined that the transition instruction has arrived ("YES" in step S601), the processing proceeds to step S603.

In step S603, the CPU 211 starts preliminary preparation for causing the image output apparatus 120 to transition to the power supply off state 401. First, in step S604, the CPU 211 transmits to the image processing apparatus 110 a notification indicating that the image output apparatus 120 has received the transition instruction (a reception completion notification). In response to the reception of this reception completion notification, the image processing apparatus 110 performs the processes of step S507 and thereafter in FIG. 5.

Next, in step S605, the CPU 211 determines whether the reception completion notification has arrived at the image processing apparatus 110. As described above, in step S507 in FIG. 5, if the reception completion notification has arrived at the image processing apparatus 110, the image processing apparatus 110 transmits to the image output apparatus 120 a message indicating that the image processing apparatus 110 will start the transition to the power supply off state 401 (a message indicating the start of the transition). Thus, the image output apparatus 120 determines whether the reception completion notification has arrived at the image processing apparatus 110, based on whether the image output apparatus 120 has received this message indicating the start of the transition.

If the image output apparatus 120 has not received from the image processing apparatus 110 the message indicating the start of the transition, the CPU 211 determines that the reception completion notification has not arrived at the image processing apparatus 110 (No in step S605), and the processing returns to step S604. In step S604, the CPU 211 transmits the reception completion notification to the image processing apparatus 110 again.

If, on the other hand, the image output apparatus 120 has received from the image processing apparatus 110 the message indicating the start of the transition, the CPU 211 determines that the reception completion notification has arrived at the image processing apparatus 110 (Yes in step S605), and the processing proceeds to step S606. In step S606, the CPU 211 ends the preliminary preparation for causing the image output apparatus 120 to transition to the power supply off state 401. Then, in step S607, the CPU 211 causes the image output apparatus 120 to transition to the power supply off state 401, and the processing ends. In step S607, the CPU 211 instructs the power supply control unit 215 to turn off the power supply, and the power supply control unit 215 stops the supply of power to all the components of the image output apparatus 120.

As described above, according to the first exemplary embodiment, the image processing apparatus 110 and the image output apparatus 120, which are included in the image processing system 100, cooperate to move the power supply states of both the image processing apparatus 110 and the image output apparatus 120 to the power supply off states. Thus, even if a failure has occurred due to the communication state of the network 130, it is possible to optimally manage the power supply of the image processing system 100. This can reduce the power consumption of the entire the image processing system 100.

<Description of Operation of Image Processing Apparatus When Image Processing Apparatus and Image Output Apparatus Transition to Power Supply Off States According to a Second Exemplary Embodiment>

The second exemplary embodiment is described below. In the example according to the first exemplary embodiment, if the image processing apparatus 110 and the image output apparatus 120 transition to the power supply off states 401, the image processing apparatus 110 and the image output apparatus 120 transition to the power supply off states 401 in conjunction with each other. However, this example is not seen to be limiting.

For example, there is a case where the communication between the image processing apparatus 110 and the public network 130 is temporarily interrupted due to the restart of a device or a change in the connection of wiring. If the image processing apparatus 110 and the image output apparatus 120 transition to the power supply off states every time such a case arises and then transition to the power supply on states again, the effects of power saving and the convenience may decrease. On the contrary, unnecessary power may even be consumed. In the second exemplary embodiment, to cause the image processing apparatus 110 and the image output apparatus 120 to transition to the power supply off states while maintaining the effects of power saving and the convenience, the function of reconfirming a condition for transitioning to the power supply off state is provided in the power supply off state transition process. The function is described in detail below. Components similar to those of the first exemplary embodiment are not described here.

Figure 7B:
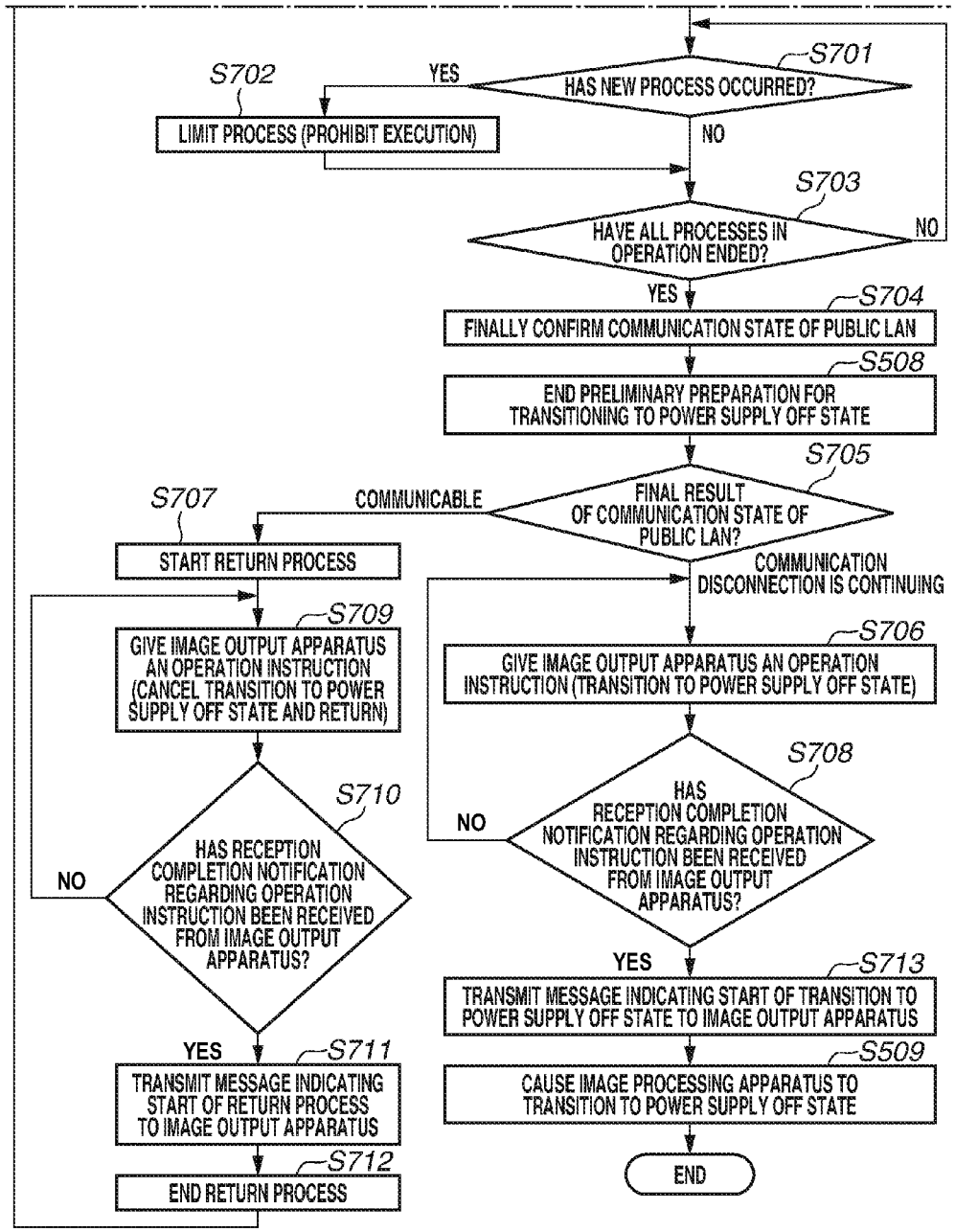
FIG. 7 (including FIGS. 7A and 7B) is a flow chart illustrating the processing performed by an image processing apparatus according to a second exemplary embodiment.

With reference to FIG. 7 (including FIGS. 7A and 7B), a description is given below of the operation of the image processing apparatus 110 when the image processing apparatus 110 transitions to the power supply off state 401 in the second exemplary embodiment.

FIG. 7 (including FIGS. 7A and 7B) is a flow chart illustrating the processing performed by the image processing apparatus 110 according to the second exemplary embodiment. The processing of the flow charts illustrated in FIG. 7 (including FIGS. 7A and 7B) is achieved by the CPU 201 executing a program loaded into the memory 202. Steps similar to those in FIG. 5 are designated by the same step numbers.

Steps S501 to S507 are not described here. After, in step S507, the CPU 201 of the image processing apparatus 110 has notified the image output apparatus 120 that the image processing apparatus 110 has received the reception completion notification, the processing proceeds to step S701. In step S701, the CPU 201 monitors the presence or absence of the occurrence of a new process in the image processing apparatus 110 which is unnecessary for transitioning to the power supply off state 401. The following are specific examples of the new process unnecessary for transitioning to the power supply off state 401:

The process of saving setting data in the image processing apparatus 110, which is performed periodically and will be started hereafter Various processes that are performed periodically by the cooperation of the image processing apparatus 110 and the image output apparatus 120 and will be started hereafter (e.g., a calibration process and a printing process)

An information update process that is performed periodically and will be started hereafter (e.g., the process of updating sheet remaining information, or the process of updating toner remaining amount information, transmitted from the image output apparatus 120).

If it is determined in step S701 that the new process has occurred ("YES" in step S701), the processing proceeds to step S702. In step S702, the CPU 201 limits a process and ends the new process without allowing the execution of the new process, and the processing proceeds to step S703. That is, the CPU 201 limits the execution of the new process having occurred after the communication disconnection state has been detected in step S502. If, on the other hand, it is determined that the new process has not occurred ("NO" in step S701), the processing immediately proceeds to step S703.

In step S703, the CPU 201 determines the finishing status of processes being in operation (in execution) that are currently performed in the image processing apparatus 110. The following are specific examples of the processes being in operation:

The process being in operation of saving setting data in the image processing apparatus 110

Various processes being in operation that are performed by the cooperation between the image processing apparatus 110 and the image output apparatus 120 (e.g., a calibration process and a printing process)

An information update process being in operation (e.g., the process of updating sheet remaining information, or the process of updating toner remaining amount information, transmitted from the image output apparatus 120)

If it is determined in step S703 that all the processes in operation have not ended (No in step S703), the processing returns to step S701. In step S701, the CPU 201 monitors the presence or absence of the occurrence of a new process in the image processing apparatus 110 which is unnecessary for transitioning to the power supply off state 401 again.

If, on the other hand, it is determined that all the processes in operation have ended (Yes in step S703), the processing proceeds to step S704. In step S704, the CPU 201 confirms (detects) the operating condition of the network I/F 204 again, and the processing proceeds to step S508. In step S508, the CPU 201 ends the preliminary preparation for causing the image processing apparatus 110 to transition to the power supply off state 401, and the processing proceeds to step S705.

In step S705, the CPU 201 finally determines the state of communication between the image processing apparatus 110 and the public network 130 based on the result of the confirmation in step S704. Then, if it is determined that the communication disconnection state is continuing (the communication disconnection state has been detected again) ("Communication disconnection is continuing" in step S705), the processing proceeds to step S706.

In step S706, the CPU 201 gives the image output apparatus 120 an operation instruction to transition to the power supply off state 401. Having received this transition instruction, the CPU 211 of the image output apparatus 120 performs the processes of steps S804 to S807. In the process of step S807, the CPU 211 transmits to the CPU 201 of the image processing apparatus 110 a notification that the image output apparatus 120 has received the transition instruction (a reception completion notification).

In step S708, the CPU 201 determines whether the image processing apparatus 110 has received the reception completion notification from the image output apparatus 120. Then, if it is determined that the image processing apparatus 110 has not yet received the reception completion notification from the image output apparatus 120 ("NO" in step S708), the processing returns to step S706. In step S706, the CPU 201 sends the transition instruction to the image output apparatus 120 again.

If, on the other hand, it is determined in step S708 that the image processing apparatus 110 has received the reception completion notification from the image output apparatus 120 ("YES" in step S708), the processing proceeds to step S713. In step S713, in response to the arrival of the reception completion notification, the CPU 201 transmits to the image output apparatus 120 a message indicating that the image processing apparatus 110 will start the transition to the power supply off state 401 (a final message indicating the start of the transition). According to this message, the image output apparatus 120 performs the processes of step S808 and thereafter transitions to the power supply off state 401.

After having transmitted to the image output apparatus 120 the final message indicating the start of the transition in step S713, then in step S509, the CPU 201 causes the image processing apparatus 110 to transition to the power supply off state 401, and the processing ends.

Further, if it is determined in step S705 that the image processing apparatus 110 and the public network 130 are able to communicate with each other (have entered the state of communicating with each other) ("Communicable" in step S705), the processing proceeds to step S707. This case corresponds to the above case of an unnecessary transition to the power supply off state due to temporary interruption. Thus, it is not necessary to transition to the power supply off state. Thus, in step S707, the CPU 201 cancels a process which has been prepared so that the image processing apparatus 110 can transition to the power supply off state 401 any time. Then, the CPU 201 starts a return process.

First, in step S709, the CPU 201 transmits to the image output apparatus 120 an instruction to cancel the transition to the power supply off state 401 and perform a return process (a transition cancellation and return instruction). Having received this transition cancellation and return instruction, the CPU 211 of the image output apparatus 120 performs the processes of steps S804 to S810. In the process of step S810, the CPU 211 transmits to the CPU 201 of the image processing apparatus 110 a notification that the image output apparatus 120 has received the transition cancellation and return instruction (a reception completion notification).

In step S710, the CPU 201 determines whether the image processing apparatus 110 has received the reception completion notification from the image output apparatus 120. Then, if it is determined that the image processing apparatus 110 has not yet received the reception completion notification from the image output apparatus 120 ("NO" in step S710), the processing returns to step S709. In step S709, the CPU 201 sends the transition cancellation and return instruction to the image output apparatus 120 again.

If, on the other hand, it is determined in step S710 that the image processing apparatus 110 has received the reception completion notification from the image output apparatus 120 ("YES" in step S710), the processing proceeds to step S711. In step S711, according to the arrival of the reception completion notification, the CPU 201 transmits to the image output apparatus 120 a message indicating that the image processing apparatus 110 will cancel the transition to the power supply off state 401 and start the return process (a message indicating the start of the return). According to this message, the image output apparatus 120 performs the processes of step S811 and thereafter causes the image output apparatus 120 to carry out the return process.

Next, in step S712, the CPU 201 of the image processing apparatus 110 ends the return process of the image processing apparatus 110, and the processing returns to step S501.

<Description of Operation of Image Output Apparatus When Image Processing Apparatus and Image Output Apparatus Transition to Power Supply Off States>

With reference to FIG. 8 (including FIGS. 8A and 8B), a description is given below of the operation of the image output apparatus 120 when the image output apparatus 120 transitions to the power supply off state 401 in the second exemplary embodiment.

FIG. 8 (including FIGS. 8A and 8B) is a flow chart illustrating the processing performed by the image output apparatus 120 according to the second exemplary embodiment. The processing of the flow charts illustrated in FIG. 8 (including FIGS. 8A and 8B) is realized by the CPU 211 executing a program loaded into the memory 212. Steps similar to those in FIG. 6 are designated by the same step numbers.

Steps S601 to S605 are not described here. If it is determined in step S605 that the notification indicating that the image output apparatus 120 has received the instruction to transition to the power supply off state 401 (the reception completion notification) has arrived at the image processing apparatus 110 (Yes in step S605), the processing proceeds to step S801. In step S801, the CPU 211 monitors the presence or absence of the occurrence of a new process in the image output apparatus 120 which is unnecessary for transitioning to the power supply off state 401. The following are specific examples of the new process unnecessary for transitioning to the power supply off state 401.

The process of saving setting data in the image output apparatus 120, which is performed periodically and will be started hereafter Various processes that are performed periodically by the cooperation between the image processing apparatus 110 and the image output apparatus 120 and will be started hereafter (e.g., a calibration process and a printing process)

An information update process that is performed periodically and will be started hereafter (e.g., the process of updating setting information transmitted from the image processing apparatus 110)

If it is determined that the new process has occurred ("YES" in step S801), the processing proceeds to step S802. In step S802, the CPU 211 places a process limitation and ends the new process without allowing the execution of the new process, and the processing proceeds to step S803. If, on the other hand, it is determined that the new process has not occurred ("NO" in step S801), the processing immediately proceeds to step S803.

In step S803, the CPU 211 determines a finishing status of the processes being in operation that are performed in the image output apparatus 120. The followings are specific examples of the processes being in operation.

The process being in operation of saving setting data in the image output apparatus 120

Various processes being in operation that are performed by the cooperation between the image processing apparatus 110 and the image output apparatus 120 (e.g., a calibration process and a printing process)

An information update process being in operation (e.g., the process of updating setting information transmitted from the image processing apparatus 110)

If it is determined in step S803 that all the processes being in operation have not ended (No in step S803), the processing returns to step S801. In step S801, the CPU 211 monitors the presence or absence of the occurrence in the image output apparatus 120 of a new process in the image output apparatus 120 which is unnecessary for transitioning to the power supply off state 401 again.

If, on the other hand, it is determined that all the processes being in operation have ended (Yes in step S803), the processing proceeds to step S804. In step S804, the CPU 211 periodically monitors an operation instruction (a final operation instruction) sent from the image processing apparatus 110 in the process of step S706 or S709 in FIG. 7B and determines the arrival of the final operation instruction.

If it is determined that the final operation instruction has not arrived ("NO" in step S804), the CPU 211 repeats the determination process in step S804. If, on the other hand, it is determined that the final operation instruction has arrived ("YES" in step S804), the processing proceeds to step S805. In step S805, the CPU 211 determines that the final operation instruction from the image processing apparatus 110 has been detected, and the processing proceeds to step S606.

In step S606, the CPU 211 ends the preliminary preparation for causing the image output apparatus 120 to transition to the power supply off state 401, and the processing proceeds to step S806. In step S806, the CPU 211 determines the final operation instruction from the image processing apparatus 110 detected in step S805.

Then, if it is determined in step S806 that the final operation instruction is an instruction to transition to the power supply off state 401 ("Transition to power supply off state" in step S806), the processing proceeds to step S807. In step S807, the CPU 211 transmits to the image processing apparatus 110 a notification indicating that the image output apparatus 120 has received the transition instruction (a reception completion notification). In response to the reception of this reception completion notification, the image processing apparatus 110 performs the processes of step S708 and thereafter in FIG. 7B.

Next, in step S808, the CPU 211 determines whether the reception completion notification has arrived at the image processing apparatus 110. As described above, in step S713 in FIG. 7B, if the reception completion notification has arrived at the image processing apparatus 110, the image processing apparatus 110 transmits to the image output apparatus 120 a message indicating that the image processing apparatus 110 will start the transition to the power supply off state 401 (a final message indicating the start of the transition). Thus, the image output apparatus 120 determines whether the reception completion notification has arrived at the image processing apparatus 110, based on whether the image output apparatus 120 has received this final message indicating the start of the transition.

If the image output apparatus 120 has not received from the image processing apparatus 110 the final message indicating the start of the transition, the CPU 211 determines that the reception completion notification has not arrived at the image processing apparatus 110 (No in step S808), and the processing returns to step S807. In step S807, the CPU 211 transmits the reception completion notification to the image processing apparatus 110 again.

If, on the other hand, the image output apparatus 120 has received from the image processing apparatus 110 the final message indicating the start of the transition, the CPU 211 determines that the reception completion notification has arrived at the image processing apparatus 110 (Yes in step S808). Then, in step S607, the CPU 211 causes the image output apparatus 120 to transition to the power supply off state 401, and the processing ends.

Further, if it is determined in step S806 that the final operation instruction is an instruction to cancel the transition to the power supply off state 401 and perform a return process (a transition cancellation and return instruction) ("Cancel transition to power supply off state and return" in step S806), the processing proceeds to step S809. This case corresponds to the case of an unnecessary transition to the power supply off state due to temporary interruption. Thus, it is not necessary to transition to the power supply off state. Thus, in step S809, the CPU 211 cancels a process which has been prepared so that the image output apparatus 120 can transition to the power supply off state 401 any time. Then, the CPU 211 starts the return process, and the processing proceeds to step S810.

In step S810, the CPU 211 transmits to the image processing apparatus 110 a notification indicating that the image output apparatus 120 has received the transition cancellation and return instruction (a reception completion notification). In response to the reception of this reception completion notification, the image processing apparatus 110 performs the processes of step S710 and thereafter in FIG. 7B.

Next, in step S811, the CPU 211 determines whether the reception completion notification has arrived at the image processing apparatus 110. As described above, in step S711 in FIG. 7B, if the reception completion notification has arrived at the image processing apparatus 110, the image processing apparatus 110 transmits to the image output apparatus 120 a message indicating that the image processing apparatus 110 will cancel the transition to the power supply off state 401 and start the return process (a message indicating the start of the return). Thus, the image output apparatus 120 determines whether the reception completion notification has arrived at the image processing apparatus 110, based on whether the image output apparatus 120 has received this message indicating the start of the return.

If the image output apparatus 120 has not received from the image processing apparatus 110 the message indicating the start of the return, the CPU 211 determines that the reception completion notification has not arrived at the image processing apparatus 110 (No in step S811), and the processing returns to step S810. In step S810, the CPU 211 transmits the reception completion notification to the image processing apparatus 110 again.

If, on the other hand, the image output apparatus 120 has received from the image processing apparatus 110 the message indicating the start of the return, the CPU 211 determines that the reception completion notification has arrived at the image processing apparatus 110 (Yes in step S811). In step S812, the CPU 211 performs the return process of the image output apparatus 120, and the processing returns to step S601. The return process refers to the process of lifting the limitation placed on the process having newly occurred in step S802, and returning the image output apparatus 120 to a normal processing state.

As described above, according to the second exemplary embodiment, in addition to the effects of the first exemplary embodiment, even if the communication between the image processing apparatus 110 and the public network 130 is temporarily interrupted due to the restart of a device or a change in the connection of wiring, it is possible to prevent an unnecessary operation of turning on and off the power supply. Thus, it is possible to prevent an unnecessary operation of causing the image processing apparatus 110 and the image output apparatus 120 to transition to the power supply off state every time the communication is temporarily interrupted as described above, and then transition to the power supply on state again. This can achieve power saving.

In step S702 in FIG. 7B, the CPU 201 of the image processing apparatus 110 is configured to cancel a new process. Alternatively, control may be performed such that the process canceled in step S702 is stored in the HDD 203 of the image processing apparatus 110, and after the image processing apparatus 110 has returned from the power supply off state 401 or the return process has ended in step S712, the CPU 201 executes the process stored in the HDD 203. Similarly, control may be performed such that the process canceled in step S802 in FIG. 8B is stored in the HDD 216 of the image output apparatus 120, and after the image output apparatus 120 has returned from the power supply off state 401 or the return process has ended in step S812, the CPU 201 executes the process stored in the HDD 216.

<Effects>

According to the configuration of each exemplary embodiment, if the image processing apparatus 110 has detected a state where the public network I/F 204 cannot establish communication, the image processing apparatus 110 and the image output apparatus 120 cooperate to cause the power supply states of both the image processing apparatus 110 and the image output apparatus 120 to transition to the power supply off states 401. Such a configuration achieves the optimal management of the power supply of an image processing system based on the communication state of a network.

Thus, for example, if a communication abnormality has occurred in the public network 130 due to the shutdown of a communication device, the restart of a communication device, or the disconnection of wiring, the public network 130 and the image processing system 100 are not connected to each other. Thus, it is possible to reduce the power consumption of the entire image processing system 100 according to the ErP Directive.

Further, in each exemplary embodiment, a description has been given of the image processing system 100 including the image processing apparatus 110 connected to the network 130 and the image output apparatus 120 connected to the image processing apparatus 110. The present disclosure, however, is not limited to the image processing system 100 including the image processing apparatus 110 and the image output apparatus 120. Alternatively, for example, any system including a first apparatus connected to a network and a second apparatus (or a plurality of apparatuses) connected to the first apparatus is applicable. That is, any system where a plurality of apparatuses cooperate with each other to perform an operation, and at least one of the apparatuses in the system receives an instruction from a network and gives an instruction to another apparatus is applicable.

Further, in each exemplary embodiment, each apparatus is configured to transition to the power supply off state according to the state of communication with the network 130. However, the power state to which the image processing apparatus 110 or the image output apparatus 120 transitions when the communication with the network 130 is disconnected is not limited to the power supply off state. Alternatively, when the communication with the network 130 is disconnected, the image processing apparatus 110 or the image output apparatus 120 may transition to a predetermined power state where the power consumption is smaller. For example, in step S505 (and step S706), the CPU 201 may instruct the image output apparatus 120 to transition to the power saving state 404. In step S509, the image processing apparatus 110 transitions to the power saving state 404 and in step S607, the image output apparatus 120 transitions to the power saving state 404.

As described above, if the communication between the public network 130 connected to the image processing system 100 and the image processing system 100 has been disconnected, the image processing apparatus 110 and the image output apparatus 120, which are included in the image processing system 100, can transition to appropriate power states in conjunction with each other. This enables the optimal management of the power supply of an image processing system based on the communication state of a network.

Thus, it is possible to reduce unnecessary power consumption when a network is disconnected in a system where a plurality of apparatuses cooperates with each other to process a job received from the network.

The configurations and the contents of the above various types of data are not limited. The data types can have various configurations and contents according to the use and purpose.

While examples of exemplary embodiments have been described above, embodiments describing a system, an apparatus, a method, a program, and a storage medium are applicable. Specifically, the present disclosure may be applied to a system including a plurality of devices or may be applied to an apparatus including a single device.

Further, any configurations obtained by combining the above exemplary embodiments are applicable.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-081642 filed Apr. 11, 2014, which is hereby incorporated by reference herein in its entirety.

What is claimed is:

1. A system comprising:
    an image processing apparatus configured to generate a print image based on a print job received from an external apparatus; and
    an image output apparatus configured to print using the print image transmitted from the image processing apparatus,
    the image processing apparatus comprising:
    a determination unit configured to determine whether the image processing apparatus can communicate with the external apparatus; and
    a first transmission unit configured to, if the determination unit determines that the image processing apparatus cannot communicate with the external apparatus, transmit to the image output apparatus an instruction to cause the image output apparatus to transition to a power saving state,
    the image output apparatus comprising:
    a first reception unit configured to receive the instruction transmitted from the first transmission unit; and
    a first control unit configured to, if the first reception unit has received the instruction, cause the image output apparatus to transition to the power saving state.

2. The system according to claim 1, wherein the power saving state includes an off state, where supply of power to the image output apparatus is stopped.

3. The system according to claim 1, wherein the image output apparatus further comprises a second transmission unit configured to, if the first reception unit has received the instruction transmitted from the first transmission unit, transmit to the image processing apparatus a response indicating that the first reception unit has received the instruction.

4. The system according to claim 3, wherein the image processing apparatus further comprises:
    a second reception unit configured to receive the response transmitted from the second transmission unit; and
    a second control unit configured to, if the second reception unit has received the response, cause the image processing apparatus to transition to a power saving state.

5. The system according to claim 4, wherein, before the second control unit causes the image processing apparatus to transition to the power saving state, the first transmission unit notifies the image output apparatus that the image processing apparatus will transition to the power saving state.

6. The system according to claim 5, wherein, after the first reception unit has received the instruction, if the first reception unit has received the notification transmitted from the first transmission unit, the first control unit causes the image output apparatus to transition to the power saving state.

7. The system according to claim 1, wherein, if the image processing apparatus has disconnected communication with the external apparatus, the determination unit determines that the image processing apparatus can communicate with the external apparatus.

8. The system according to claim 1, wherein the image processing apparatus further comprises a limitation unit configured to limit execution of a new process having occurred after the determination unit has determined that the image processing apparatus cannot communicate with the external apparatus.

9. The system according to claim 8, further comprising:
    a storage unit configured to store the process of which the execution has been limited by the limitation unit; and
    an execution unit configured to, after the image processing apparatus has returned from a power saving state, execute the process stored in the storage unit.

10. The system according to claim 1, wherein the image processing apparatus generates raster image data as the print image and transmits the raster image data to the image output apparatus.

11. The system according to claim 1, wherein the image processing apparatus and the image output apparatus are connected by an image video cable for transmitting image data and a control cable for transmitting a control command.

12. An image processing apparatus for generating a print image based on a print job received from an external apparatus, the image processing apparatus capable of connecting to an image output apparatus for performing printing using the print image transmitted from the image processing apparatus, the image processing apparatus comprising:
    a determination unit configured to determine whether the image processing apparatus can communicate with the external apparatus; and
    a transmission unit configured to, if the determination unit determines that the image processing apparatus cannot communicate with the external apparatus, transmit to the image output apparatus an instruction to cause the image output apparatus to transition to a power saving state.

13. The image processing apparatus according to claim 12, further comprising:
    a reception unit configured to receive a response to the instruction transmitted from the transmission unit; and
    a control unit configured to, if the reception unit has received the response, cause the image processing apparatus to transition to a power saving state.

14. The image processing apparatus according to claim 13, wherein, before the control unit causes the image processing to transition to a power saving state, the transmission unit notifies the image output apparatus that the image processing apparatus will transition to the power saving state.

15. The image processing apparatus according to claim 12, wherein, if the image processing apparatus has disconnected communication with the external apparatus, the determination unit determines that the image processing apparatus can communicate with the external apparatus.

16. The image processing apparatus according to claim 12, further comprising a limitation unit configured to limit execution of a new process having occurred after the determination unit has determined that the image processing apparatus cannot communicate with the external apparatus.

17. The image processing apparatus according to claim 12, wherein the image processing apparatus generates raster image data as the print image and transmits the raster image data to the image output apparatus.

18. The image processing apparatus according to claim 12, wherein the image processing apparatus is connected to the image output apparatus by an image video cable for transmitting image data and a control cable for transmitting a control command.

19. A method for controlling an image processing apparatus for generating a print image based on a print job received from an external apparatus, the image processing apparatus capable of connecting to an image output apparatus for performing printing using the print image transmitted from the image processing apparatus, the method comprising:
    determining whether the image processing apparatus can communicate with the external apparatus; and
    transmitting to the image output apparatus, if it is determined that the image processing apparatus cannot communicate with the external apparatus, an instruction to cause the image output apparatus to transition to a power saving state.

* * * * *